(12) United States Patent
Yadav et al.

(10) Patent No.: US 12,461,044 B2
(45) Date of Patent: Nov. 4, 2025

(54) DEVICE AND METHOD FOR DIELECTRIC MATERIAL CHARACTERIZATION

(71) Applicant: Stichting IMEC Nederland, Wageningen (NL)

(72) Inventors: Rahul Yadav, Wageningen (NL); Peter Offermans, Zaltbommel (NL); Jan Willem de Wit, Deventer (NL); Bas Boom, Maarssen (NL)

(73) Assignee: Stichting Imec Nederland, Wageningen (NL)

( * ) Notice: Subject to any disclaimer, the term of this patent is extended or adjusted under 35 U.S.C. 154(b) by 175 days.

(21) Appl. No.: 18/362,051

(22) Filed: Jul. 31, 2023

(65) Prior Publication Data

US 2024/0035987 A1 Feb. 1, 2024

(30) Foreign Application Priority Data

Aug. 1, 2022 (EP) .................................. 22188028

(51) Int. Cl.
  *G01N 22/00* (2006.01)
  *G01N 33/02* (2006.01)
  *H01P 7/10* (2006.01)

(52) U.S. Cl.
  CPC ........... *G01N 22/00* (2013.01); *G01N 33/025* (2013.01); *H01P 7/10* (2013.01)

(58) Field of Classification Search
  CPC ......... G01N 22/00; G01N 33/025; H01P 7/10
  USPC ....................................................... 324/637
  See application file for complete search history.

(56) References Cited

U.S. PATENT DOCUMENTS

| 5,990,767 A | 11/1999 | Ivanov et al. |
| 2010/0026300 A1 | 2/2010 | Klein et al. |
| 2011/0234240 A1* | 9/2011 | Yager .................. A61B 5/4875 324/634 |

(Continued)

FOREIGN PATENT DOCUMENTS

| CA | 3016064 A1 | 2/2020 |

OTHER PUBLICATIONS

Akgol, O., E. Unal, Mehmet Bamanc, Muharrem Karaaslan, Umur Korkut Sevim, Murat Öztürk, and Avanish Bhadauria. "A nondestructive method for determining fiber content and fiber ratio in concretes using a metamaterial sensor based on a v-shaped resonator." Journal of Electronic Materials 48 (2019): 2469-2481.

(Continued)

*Primary Examiner* — Raul J Rios Russo
(74) *Attorney, Agent, or Firm* — McDonnell Boehnen Hulbert & Berghoff LLP

(57) ABSTRACT

A device for dielectric material characterization of a test sample is provided. The device comprises a resonator block comprising a groove at at least one side of the resonator block, wherein the groove comprises at least a first inclined surface and a second inclined surface and is configured to contact the test sample via the first inclined surface and/or the second inclined surface. In this regard, the resonator block is configured to generate a rotational electric field coupled between the first inclined surface and the second inclined surface of the groove and further to propagate the rotational electric field partially or fully through the test sample in order to perform dielectric material characterization of the test sample.

18 Claims, 7 Drawing Sheets

(56) References Cited

U.S. PATENT DOCUMENTS

| | | | | |
|---|---|---|---|---|
| 2016/0099492 A1* | 4/2016 | Yuan | ............... | H01P 1/2084 |
| | | | | 333/219.1 |
| 2018/0007745 A1* | 1/2018 | Smith | ............... | H05B 6/72 |
| 2018/0143145 A1* | 5/2018 | Klein | ............... | G01N 22/00 |
| 2020/0203833 A1* | 6/2020 | Ma | ............... | H01Q 23/00 |
| 2023/0111583 A1* | 4/2023 | Kim | ............... | H01Q 9/0485 |
| | | | | 343/702 |

OTHER PUBLICATIONS

Muvianto, Cahyo Mustiko Okta, Kurniawan Yuniarto, Suthami Ariessaputra, Budi Darmawan, Made Yadnya, and A. Rachman. "Detection of Sugar Content in Mango Fruit using Coaxial Cavity Resonator." In Proceedings International Conference on Science and Technology (ICST), vol. 1. 2020.

* cited by examiner

700

```
┌─────────────────────────────────────────────┐
│ providing a resonator block comprising a groove at at
│ least one side of the resonator block having at least a
│ first inclined surface and a second inclined surface for      ── 701
│ contacting a test sample via the first inclined surface
│ and/or the second inclined surface
└─────────────────────────────────────────────┘
                        │
                        ▼
┌─────────────────────────────────────────────┐
│ generating a rotational electric field coupled between        ── 702
│ the first inclined surface and the second
│ inclined surface of the groove
└─────────────────────────────────────────────┘
                        │
                        ▼
┌─────────────────────────────────────────────┐
│ propagating the rotational electric field partially           ── 703
│ or fully through the test sample
└─────────────────────────────────────────────┘
                        │
                        ▼
┌─────────────────────────────────────────────┐
│ measuring the transmission through and/or                     ── 704
│ the reflection from the test sample
└─────────────────────────────────────────────┘
```

Fig. 7

DEVICE AND METHOD FOR DIELECTRIC MATERIAL CHARACTERIZATION

CROSS-REFERENCE TO RELATED APPLICATIONS

The present application is a non-provisional patent application claiming priority to European Patent Application No. EP 22188028.9, filed Aug. 1, 2022, the contents of which are hereby incorporated by reference.

FIELD OF THE DISCLOSURE

The present disclosure relates to radio frequency (RF) and/or microwave based dielectric material characterization of a test sample, such as fruits or other product samples, especially for determining maturation and/or maturity indices in a non-destructive manner.

BACKGROUND

RF/microwave-based dielectric spectroscopy has already been established for the assessment of food products. In this context, microwave-based cavity resonators may be used for material sensing in a destructive or a non-destructive manner. For example, the document U.S. Pat. No. 5,990,767 A discloses a dielectrically loaded cavity resonator that is formed as a closed system. However, a material sensing device based on such closed systems may require destroying or mutilating a sample for effective positioning of the sample at or near the sensing device.

Moreover, conventional microwave coaxial probes or resonators, which allow non-destructive material sensing, may only be able to probe smaller volumes of the fruit sample due to their typically limited coupling area and electric field penetration depth. As a result, the limited small sensing volume may lead to a larger variation in the measurement parameters, necessitating multiple assessments on the same fruit sample.

SUMMARY

The present disclosure provides a device and a method for dielectric material characterization of a test sample that can account for a non-uniform texture of the test sample and further facilitate an adequate penetration through the test sample in order to maximize the volumetric sensing area.

In an example embodiment, a device is provided for dielectric material characterization of a test sample. The device comprises a resonator block comprising a groove or a slotted region at at least one side of the resonator block, wherein the groove comprises at least a first inclined surface and a second inclined surface and is configured to contact the test sample via the first inclined surface and/or the second inclined surface. In this regard, the resonator block is configured to generate a rotational electric field coupled between the first inclined surface and the second inclined surface of the groove and further to propagate the rotational electric field partially or fully through the test sample in order to perform dielectric material characterization of the test sample.

Therefore, by means of the resonator block, a localized rotational electric field distribution can be generated that may remain tightly coupled within the groove, especially between the first inclined surface and the second inclined surface of the groove. This may ensure interaction of the volumetric electric field through the test sample, thereby resulting in a high penetration into the test sample. Furthermore, a two-way coupled electric field interaction with the test sample can be facilitated in order to probe a larger effective area on the test sample, thereby improving probing sensitivity. Moreover, in the case of measuring a fruit sample, the high penetration depth or sampling volume may facilitate measurements of the properties of the flesh beneath the skin of the fruit sample.

In an example embodiment, the device further comprises an input port configured to couple energy into the resonator block, and an output port configured to couple energy out of the resonator block. The input port and the output port may be coupled to the resonator block via respective signal lines or transmission lines, e.g. Microstrip lines. In this regard, the resonator block may be excited from the input port and a signal transmission response may be analyzed from the input port to the output port.

In an example embodiment, the device may comprise only one signal port to couple energy into the resonator block as well as to couple energy out of the resonator block. The signal port may be coupled to the resonator block via a signal line or transmission line, e.g. Microstrip lines. In this regard, the resonator block may be excited from the signal port and a signal reflection response may be analyzed at the signal port.

In an example embodiment, the device further comprises a ground plane, a dielectric base arranged on the ground plane, and signal lines corresponding to the input port and the output port arranged on the dielectric base in order to form a Microstrip configuration, whereby the Microstrip configuration is configured to encompass the resonator block, the input port and the output port. The dielectric base may comprise a dielectric material according to FR-4 or CEM standards or a synthetic polymer or a polyimide. The ground plane may comprise a conductive material, e.g. copper.

In an example embodiment, the resonator block comprises a cubic or a quasi-cubic dielectric resonator, or a bulk dielectric resonator, arranged near or on the dielectric base, and a buried metal line conductively coupled to the ground plane arranged near or at a center of the dielectric resonator perpendicular to the ground plane. In this regard, the dielectric resonator comprises the groove positioned at one side of the dielectric resonator.

In an example embodiment, the dielectric resonator may be configured to generate an electric field, whereby the buried metal line is configured to circulate the electric field within the dielectric resonator, thereby generating the rotational electric field. As such, unlike bare dielectric resonators that generate leaky fields, the provision of the buried grounded metallization or buried grounded metal line or buried grounded metal, especially at the center of the bulk dielectric resonator, facilitates tightly bounded electric field generation and further to circulate the generated electric within the dielectric resonator to facilitate the rotational electric field generation. In some examples, the provision of the buried grounded metallization may result in spatially coupled rotational electric fields within the groove or slotted region.

In an example embodiment, the groove may be a triangular groove or a V-shaped groove, whereby the first inclined surface and the second inclined surface intersect at a point or at a curve. Alternatively, the groove may be a U-shaped groove or a uniformly tapered rectangular groove, whereby the first inclined surface and the second inclined surface may be spatially separated with a defined distance or gap.

In an example embodiment, the dielectric resonator comprises a dielectric material having a relative permittivity $\varepsilon_r$ of at least 10. In some examples, the dielectric material has a relative permittivity $\varepsilon_r$ of more than 50. In some examples, the dielectric material has a relative permittivity $\varepsilon_r$ of more than 70. In some examples, the dielectric material has a relative permittivity $\varepsilon_r$ in the range of 80 to 100. In this regard, the dielectric material is an oxide based and/or ceramic-based dielectric material, preferably a metal-oxide-based dielectric material, more preferably a Titanium oxide-based dielectric material.

The high relative permittivity, i.e. the high dielectric constant, of the bulk dielectric resonator may provide a unique resonance spectrum, especially a unique microwave resonance spectrum, which is sensitive to maturation or ripeness level of the test sample.

In an example embodiment, the resonator block comprises a plurality of resonator layers arranged in a stack formation on a dielectric base, each resonator layer comprises a dielectric substrate, and a split ring resonator arranged on the dielectric substrate. In this regard, each resonator layer in the stacked formation may generate a fringing electric field within the grove or slotted region of each layer, whereby the fringing electric field linkages across the groove of the stacked formation may translate into larger volumetric field distribution.

In an example embodiment, the split ring resonator comprises a first split end and a second split end correspondingly arranged along the first inclined surface and the second inclined surface of the groove. It will be understood that, at least two probing or measuring point of contacts or region can be facilitated in order to probe the test sample.

In an example embodiment, the resonator block further comprises a plurality of buried metal lines configured to couple the plurality of resonator layers in parallel such that a rotational electric field generated by each resonator layer couples to an adjacent resonator layer. The plurality of buried metal lines or metals may facilitate a parallel operation of a plurality of planer split ring resonators arranged in a stacked formation.

In an example embodiment, at least one buried metal line of the plurality of buried metal lines is arranged at or along the first inclined surface of the groove configured to conductively couple the first split ends of the plurality of resonator layers. In addition, at least one buried metal line of the plurality of buried metal lines is arranged at or along the second inclined surface of the groove configured to conductively couple the second split ends of the plurality of resonator layers. A tight coupling of the fringing electric fields especially within the groove or slotted region can be achieved.

In an example embodiment, the groove is a uniformly tapered rectangular groove, whereby the first inclined surface and the second inclined surface are spatially positioned at a defined distance. Additionally or alternatively, there is a gap between a first split end and a second split end of the split ring resonator.

In an example embodiment, the test sample is a product sample, preferably a fruit sample, and the dielectric material characterization comprises one or more maturity characteristics of the product sample, especially content of ingredients such as water and/or sugar.

In another example embodiment, a method is provided for dielectric material characterization of a test sample. The method comprises a block of providing a resonator block comprising a groove at at least one side of the resonator block having at least a first inclined surface and a second inclined surface for contacting the test sample via the first inclined surface and/or the second inclined surface. The method further comprises a block of generating a rotational electric field coupled between the first inclined surface and the second inclined surface of the groove. Moreover, the method comprises a block of propagating the rotational electric field partially or fully through the test sample.

In an example embodiment, the method further comprises a block of measuring the transmission through and/or the reflection from the test sample.

It is to be noted, any change in the dielectric property of the test sample (e.g., a change in dielectric property of a fruit sample due to a change in firmness or ripeness over time) may alter the effective permittivity of the proposed resonator block. This may result in a measurable shift in the transmission or reflection spectra, which in-turn indicates one or more characteristics (e.g., ripeness, firmness) of the test sample (e.g., fruit).

It is further to be noted that the method according to the second aspect corresponds to the device according to the first aspect and its implementation forms. Accordingly, the method according to the second aspect achieves the same effects as the device of the first aspect and its respective implementation forms.

BRIEF DESCRIPTION OF THE DRAWINGS

Exemplary embodiments of the present disclosure are now further explained with respect to the drawings by way of example only, and not for limitation. In the drawings:

FIG. 7 shows an example of the method according to the one aspect of the present disclosure.

DETAILED DESCRIPTION

Reference will now be made in detail to the embodiments of the present disclosure, examples of which are illustrated in the accompanying drawings. However, the following embodiments of the present disclosure may be variously modified and the range of the present disclosure is not limited by the following embodiments. Reference signs for similar entities in different embodiments are partially omitted.

Figure 1:
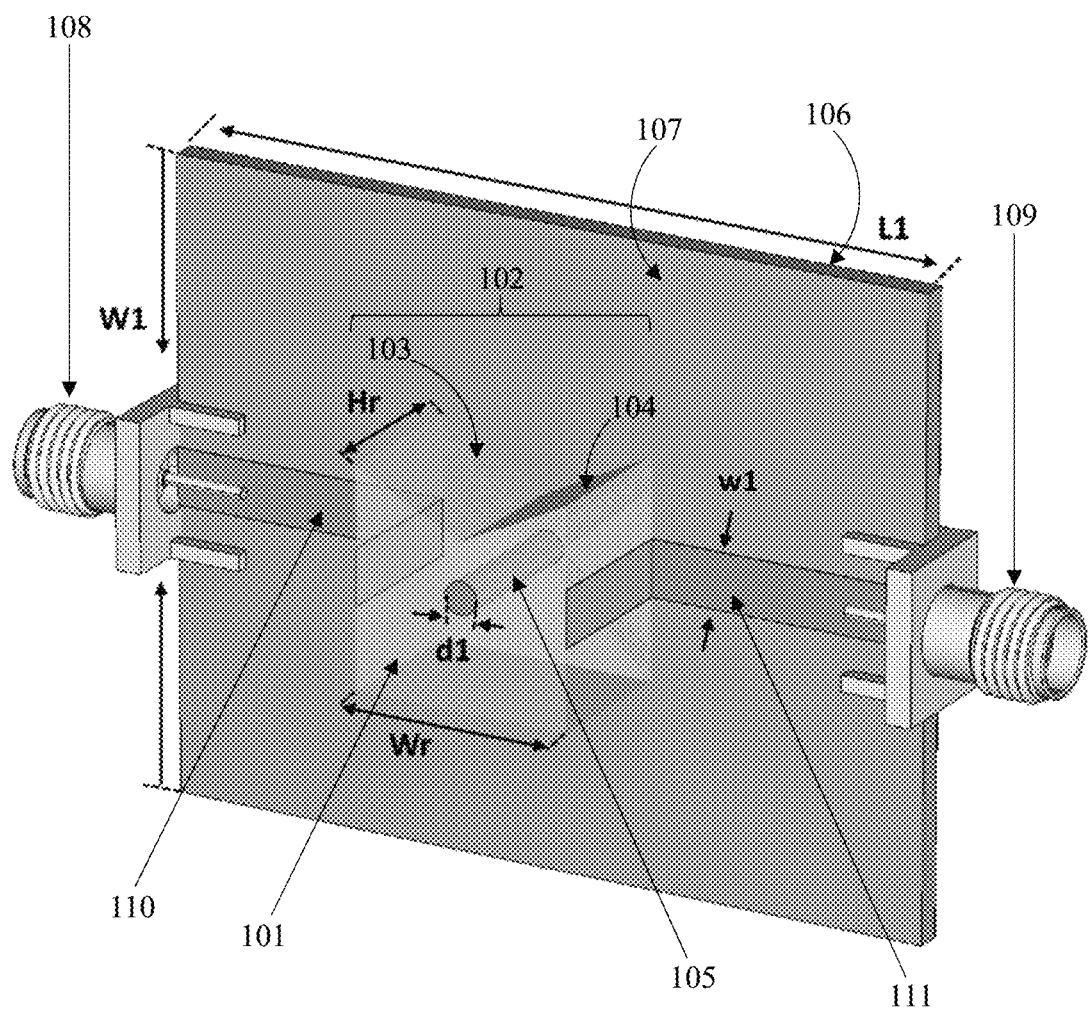
FIG. 1 shows an example of the device according to the one aspect of the present disclosure.

In FIG. 1, an example embodiment of the device 100 according to the first aspect of the present disclosure is illustrated. The device 100 comprises a bulk dielectric resonator 101 having a groove or slotted region 102 arranged at one side of the dielectric resonator 101. The groove 102 is exemplarily formed as a triangular groove having a first inclined surface 103 and a second inclined surface 104, especially intersecting at a point.

The dielectric resonator 101 is arranged on a Microstrip configuration comprising a ground plane 106, a dielectric or FR-4 base 107 arranged on top of the ground plane 106, and signal lines 110, 111. The dielectric resonator 101 is exemplarily arranged at the center of the Microstrip configuration.

The device 100 further comprises a buried grounded metallization or buried metal line or metal 105 exemplarily arranged at the center of the dielectric resonator 101, especially coupled to the ground plane 106 and is arranged in perpendicular to the ground plane 106 or the dielectric base 107 or the Microstrip configuration.

The device 100 moreover comprises an input port 108 coupled to the dielectric resonator 101, e.g. via the signal line 110, and an output port 109 coupled to the dielectric resonator 101, e.g. via the signal line 111. Although in this example, the port 108 is denoted as the input port and the port 109 is denoted as the output port, it is to be understood that due to the symmetrical structure of the Microstrip configuration and/or the dielectric resonator 101, the port 109 may also be used as the input port and the port 108 may also be used as the output port.

Alternatively, the device 100 may comprise only one signal port 108 or 109 coupled to the dielectric resonator 101 at one side of the dielectric resonator 101, e.g., via the signal line 110 or 111.

The exemplary parametric labels for the device 100, especially the dimensions of the device 100 are as follows:

$W_r$: Width of the dielectric resonator 101,
$H_r$: Height of the dielectric resonator 101,
d1: Diameter of the buried grounded metallization 105,
W1: Width of the Microstrip configuration,
L1: Length of the Microstrip configuration, and
w1: Width of the signal lines 110, 111.

In this regard, the dielectric material characterization or material sensing can be performed by interacting electromagnetic fields with a test sample, e.g. fruits, in transmission or reflection mode. For instance, when the test sample is positioned at or near the groove 102, especially contacting the first inclined surface 103 and/or the second inclined surface 104, any change in the dielectric property of the test sample may alter the effective material medium response, i.e. effective permittivity, of the dielectric resonator. This may result in a measurable shift in the transmission or reflection spectra. The dielectric material characterization for the device 100 can be mathematically understood from the electromagnetic field perturbation theory for a cavity model as follows:

$$\frac{\Delta \omega_r}{\omega_r} = \frac{\int\int\int_{vs}(\varepsilon_s - 1)\vec{E_s} \cdot \vec{E_l} dv}{2\int\int\int_{vc}|\vec{E_s}|^2 dv} \quad (1)$$

where, $\Delta \omega_r$ denotes changes in the resonance of the cavity with the test sample, $\omega_r$ denotes the fundamental resonance of the cavity without the test sample, $\varepsilon_s$ denotes the complex permittivity of the test sample, $\vec{E_s}$ denotes the electric field subjected to the test sample, $\vec{E_l}$ denotes the total electric field present in the cavity, and vs, vc are the volume of the test sample and the entire cavity, respectively.

The above cavity model can be realized by providing the bulk dielectric resonator 101 having slotted region or grove 102 at one side and forming the buried metallization at the center of the dielectric resonator in connection with the ground plane 106 of the dielectric base 107. In some example embodiments, the high dielectric constant of the dielectric resonator 101 facilitates tightly bounded fields into the test sample, which is loaded at or near the groove 102 of the dielectric resonator 101.

For instance, the device 100, especially the dielectric resonator 101, may be excited from the input port 108 and the signal transmission response may be analyzed from the input port 108 to the output port 109. Alternatively, the device 100 may be excited from only one signal port and the signal reflection response may be analyzed at said signal port. The fringing-field linkages between the first inclined surface 103 and the second inclined surface 104 of the groove 102 may be subjected to interaction or perturbation mode with the test sample. Hence, the field perturbation may alter the resonance, which can be accordingly used as a material sensing parameter.

Figure 2A:
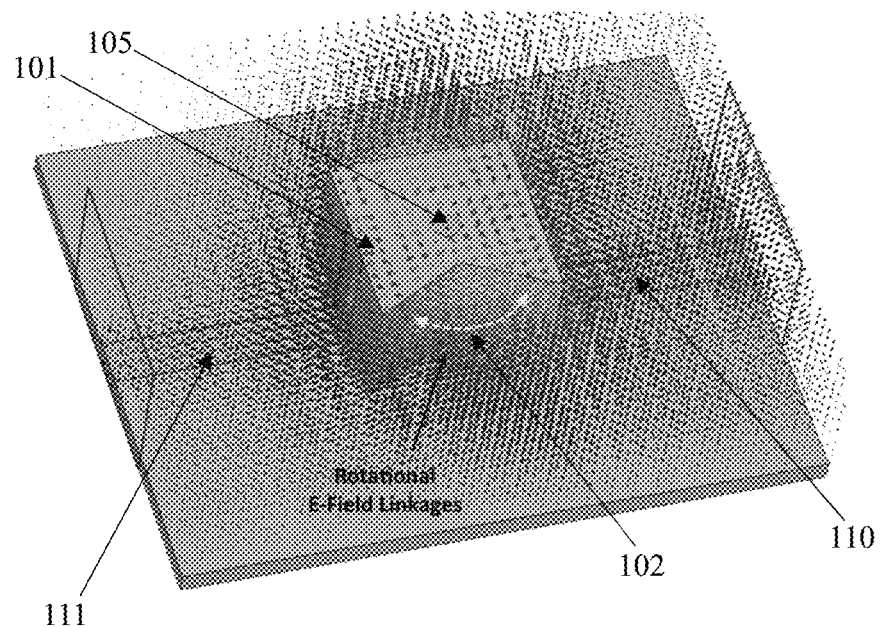
FIG. 2A shows an exemplary electric field distribution corresponding to the device of FIG. 1.

In FIG. 2A, an exemplary electric field distribution within the device 100 is illustrated. In this example, the device 100, especially the dielectric resonator 101, is excited from the input port 108 and the signal transmission response is analyzed from the input port 108 to the output port 109 via the signal lines 110, 111.

It can be seen that the bulk dielectric resonator 101 along with the buried grounded metallization 105 at the center effectively generates a localized rotational electric field distribution that remains tightly coupled between the groove or slotted region 102. This effectively ensures interaction of the volumetric electric fields through the test sample positioned at or near the groove 102, and thereby provides a higher penetration into the test sample.

Figure 2B:
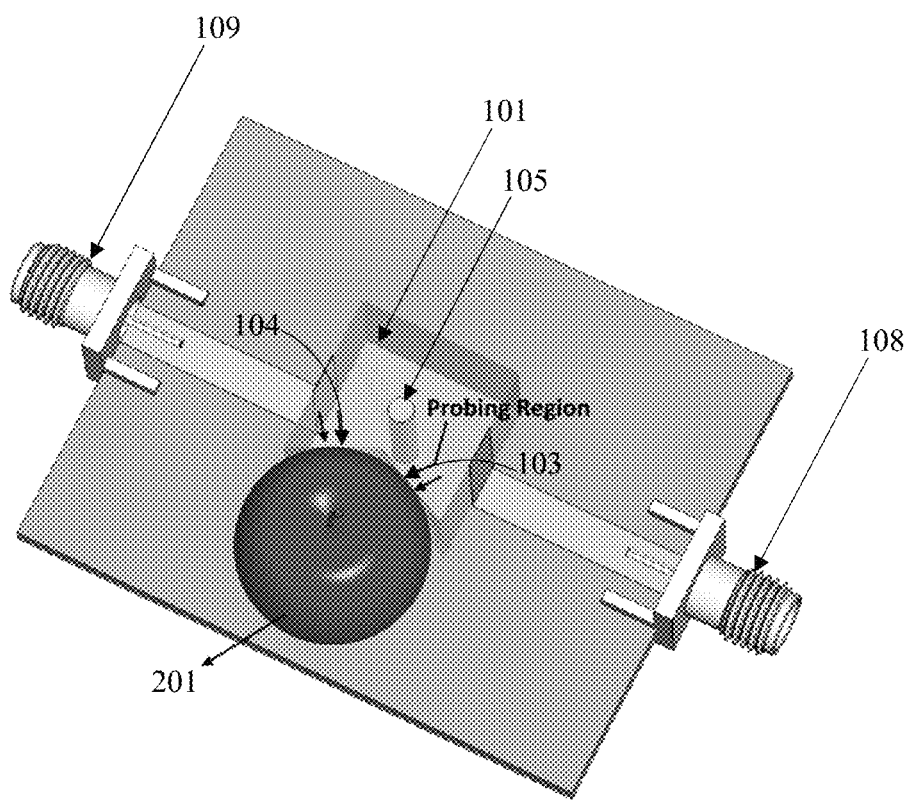
FIG. 2B shows an exemplary probing setup for the device of FIG. 1.

In FIG. 2B, an exemplary probing setup for the device 100 is illustrated. In this example, the test sample 201, shown as an apple, is positioned at a probing region of the device 100. The probing region can be essentially formed or be amended by the groove 102, especially by the shape of the groove 102, at one side of the bulk dielectric resonator 101 of the device 100.

In this example, the test sample 201 is placed at the groove 102 such that the first inclined surface 103 is in contact with one surface of the test sample 201 and the second inclined surface 104 is in contact with another surface of the test sample 201. As such, the triangular groove 102 as illustrated herein enables the contact of two surface locations of the test sample 201 with the dielectric resonator 101, which is required for effective field injection into the test sample 201. This exemplary probing arrangement may also overcome the problem of air gap from conventional single point contact sensing approaches.

Figure 3:
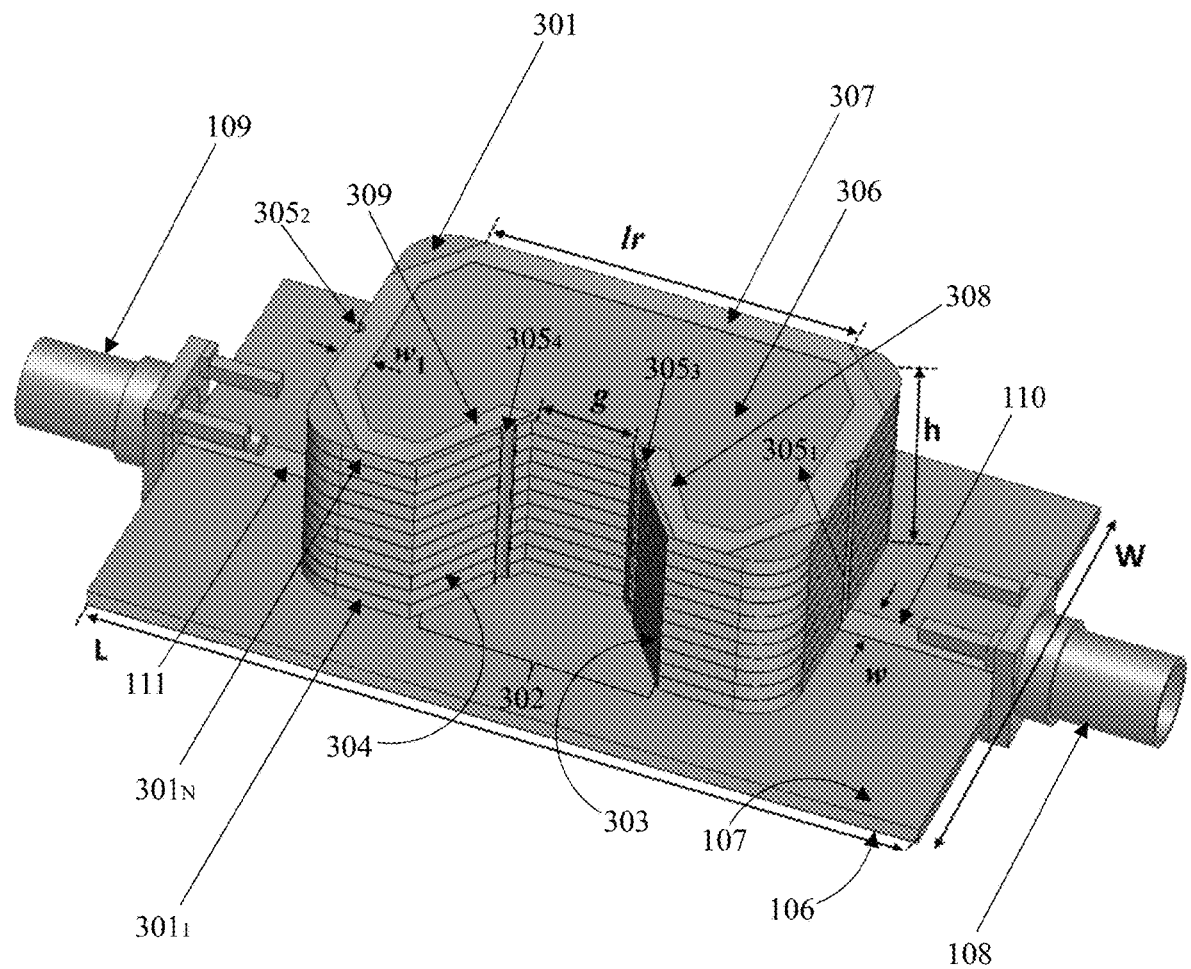
FIG. 3 shows an example of the device according to the another aspect of the present disclosure.

In FIG. 3, another example embodiment of the device 300 according to the first aspect of the present disclosure is illustrated. The device 300 differs from the device 100 in that the device 300 comprises a resonator block 301 that is formed by stacking a plurality of resonator layers instead of the bulk dielectric resonator 101. The Microstrip configuration, especially the dielectric base 107 on the ground plane 106, the signal lines 110, 111 on the dielectric base 107, the input port 108 coupled to the resonator block 301 via the signal line 110, and the output port 109 coupled to the resonator block 301 via the signal line 111 correspond to the Microstrip arrangement described as part of FIG. 1.

Alternatively, the device 300 may comprise only one signal port instead of comprising the input port 108 and the output port 109, which may be coupled to the resonator block 301 at one side of the resonator block 301, e.g., via the signal line 110 or 111.

The resonator block 301 comprises a number of N, for example at least 10 resonator layers 3011-301N, especially stacked on top of each other. Each of the number of N resonator layers 3011-301N comprises a dielectric substrate 306 and a split ring Microstrip resonator 307 arranged on the dielectric substrate 306. A slotted region or groove 302 is formed at one side of the resonator layer 3011-301N, especially a uniformly tapered rectangular groove 302 having a first inclined surface 303 and a second inclined surface 304 that are separated by a gap or distance g. The split ring resonator 307 is therefore formed to provide a first split end 308 along the first inclined surface 303 and a second split end 309 along the second inclined surface 304.

The resonator block 301 further comprises a plurality of buried metallization or metal lines 3051-3054, exemplarily at least four buried metallization, in order to form a parallel arrangement of the number of N resonator layers 3011-301N.

For instance, a first buried metallization 3051 is formed in contact with the input port 108, especially in contact with the signal line 110, a second buried metallization 3052 is formed in contact with the output port 109, especially in contact with the signal line 111, a third buried metallization 3053 is formed along the first inclined surface 303, especially coupled to the first split ends 308, and a fourth buried metallization 3054 is formed along the second inclined surface 304, especially coupled to the second split ends 309.

As such, the plurality of buried metallization 3051-3054 ensures a parallel operation of the stacked N resonator layers 3011-301N, especially to couple an electric field generated by each resonator layer to an adjacent resonator layer. For instance, the bottom ring resonator layer 3011 may couple the electric fields from bottom to higher order layers through dielectric coupling and the contact metallization 3051-3054. Each of the resonator layers 3011-301N of the parallel configuration may generate a fringing field within the groove 302 of each layer. Due to the stacking of the resonator layers 3011-301N, the fringing electric field linkage across the groove 302 or gap g may be translated into a larger volumetric distribution.

The exemplary parametric labels for the device 300, especially the dimensions of the device 300 are as follows:
  w1: Width of the split ring Microstrip resonator 307,
  $l_r$: Length of the split ring Microstrip resonator 307,
  h: Height of the resonator block or stack 301,
  g: Gap between the first split end 308 and the second split end 309 of the split ring Microstrip resonator 307,
  W: Width of the Microstrip configuration,
  L: Length of the Microstrip configuration, and
  w: Width of the signal lines 110, 111.

In this regard, the dielectric material characterization or material sensing can be performed by interacting electromagnetic fields with a test sample, e.g. fruits, in transmission or reflection mode. For instance, when the test sample is positioned at or near the groove 302, especially contacting the first inclined surface 303 and/or the second inclined surface 304, any change in the dielectric property of the test sample may alter the effective material medium response, i.e. effective permittivity, of the resonator. This may result in a measurable shift in the transmission or reflection spectra.

The dielectric material characterization for the device 300 can also be mathematically understood from the electromagnetic field perturbation theory for a cavity model according to equation (1).

Figure 4A:
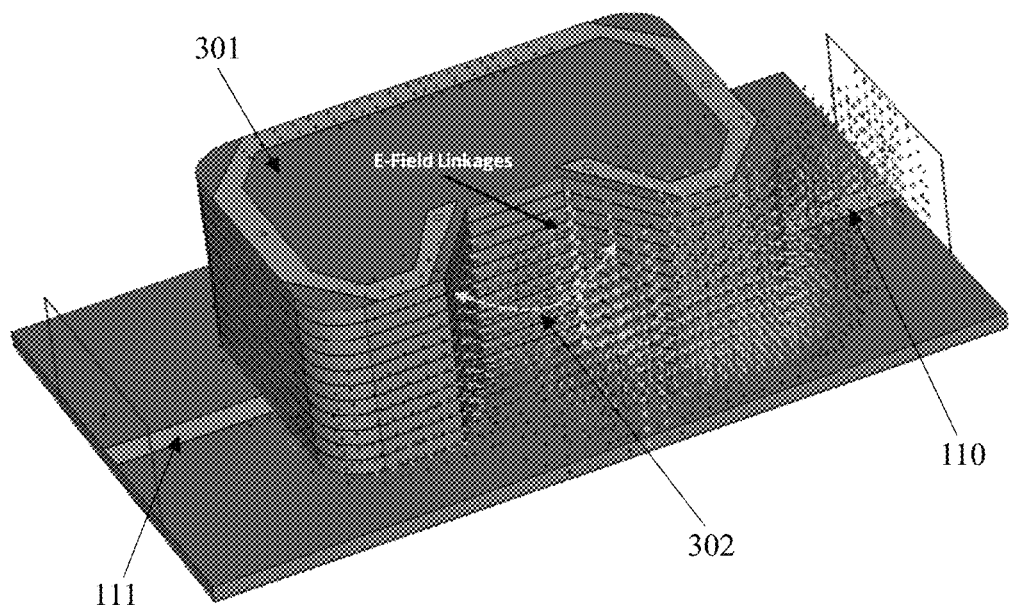
FIG. 4A shows an exemplary electric field distribution corresponding to the device of FIG. 3.

In FIG. 4A, an exemplary electric field distribution within the device 300 is illustrated. In this example, the device 300, especially the resonator block 301, is excited from the input port 108 and the signal transmission response is analyzed from the input port 108 to the output port 109 via the signal lines 110, 111.

It can be seen that the resonator block 301, especially the number of N resonator layers along with the buried metallization, effectively generates a volumetric electric field distribution that remains tightly coupled within the groove or slotted region 102. This effectively ensures interaction of the volumetric electric fields through the test sample positioned at or near the groove 102, and thereby provides a higher penetration into the test sample.

Figure 4B:
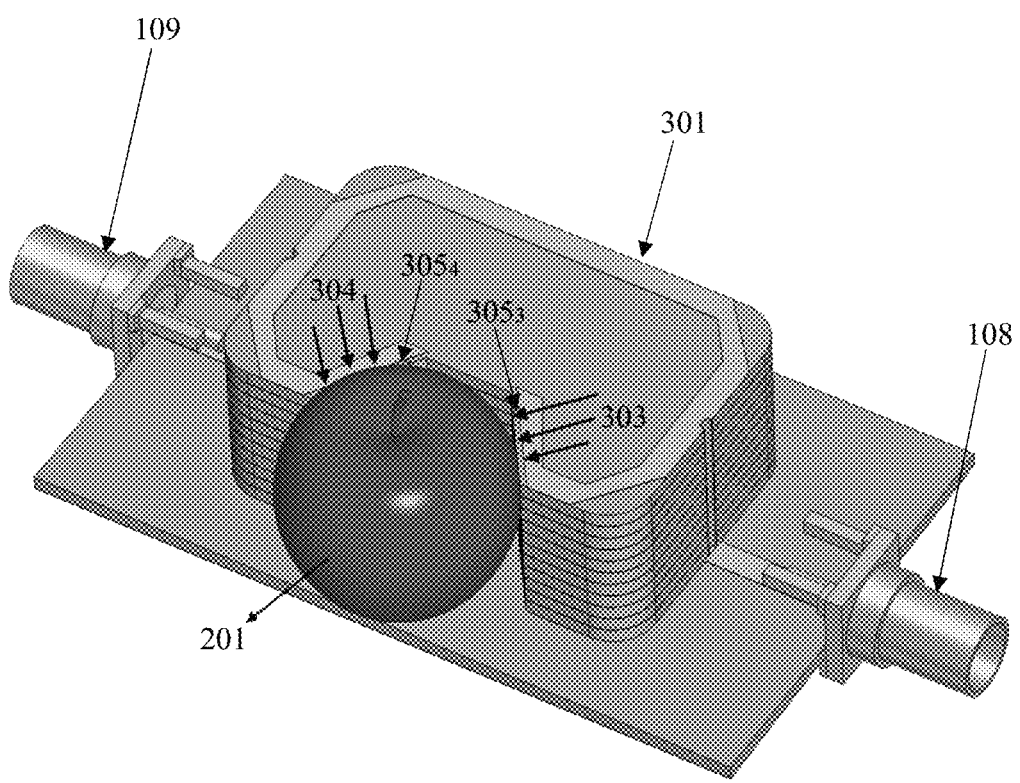
FIG. 4B shows an exemplary probing setup for the device of FIG. 3.

In FIG. 4B, an exemplary probing setup for the device 300 is illustrated. In this example, the test sample 201, shown as an apple, is positioned at a probing region of the device 300. The probing region can be essentially formed or be amended by the groove 302, especially by the shape of the groove 302, at one side of the resonator block 301 of the device 300.

In this example, the test sample 201 is placed at the groove 302 such that the first inclined surface 303 is in contact with one surface of the test sample 201 and the second inclined surface 304 is in contact with another surface of the test sample 201. As such, the groove 302 as illustrated herein enables the contact of two surface locations of the test sample 201 with the resonator block 301, which is required for effective field injection into the test sample 201.

The generation of volumetric electric field distributions and their controlled linkages in the groove 302, especially between the two contact surface locations, may effectively allow probing of the test sample with a higher penetration and into a larger effective area. This exemplary probing arrangement may also overcome the problem of air gap from conventional single point contact sensing approaches.

Figure 5A:
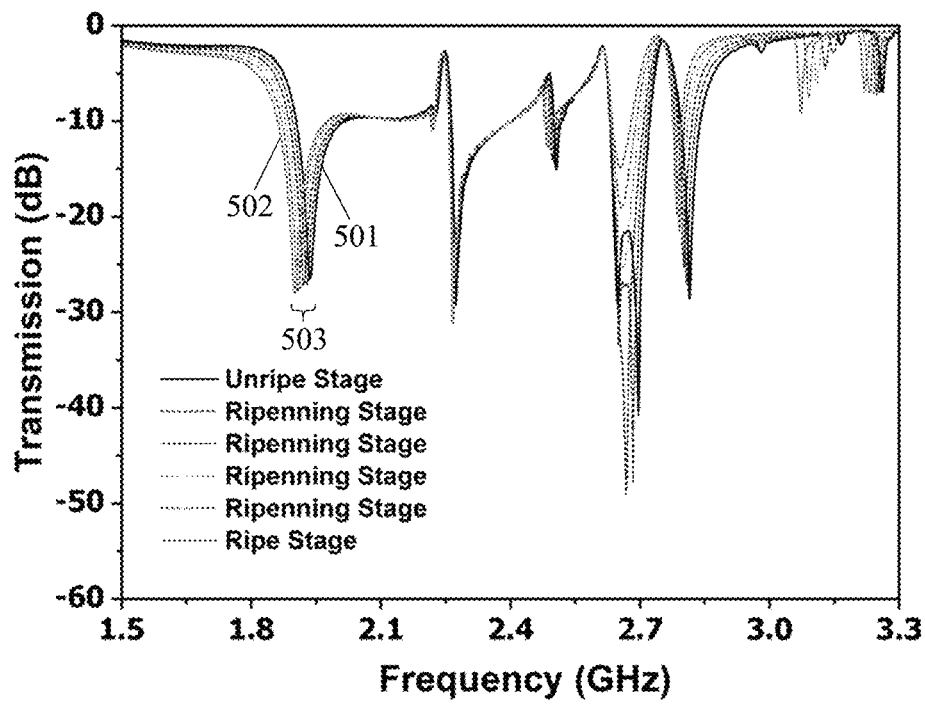
FIG. 5A shows exemplary simulation results of transmission measurements on a test sample at different maturity stages.

In FIG. 5A, exemplary simulation results of transmission measurements on the test sample 201, e.g. the apple, at different maturity stages are illustrated. Particularly, the curves show simulation results of resonance spectrum derived from different transmission measurements of the device 100, 300 with the apple, especially at different ripening stages of the apple. The horizontal axis denotes the frequency in Gigahertz and the vertical axis denotes the measured transmission parameter (S21) in decibel.

Particularly, the curve 501 shows the transmission characteristics of the apple during the unripe stage and the curve 502 shows the transmission characteristics of the apple during the ripe stage. A considerable shift in resonance 503 can be seen in the frequency domain between the curves 501 and 502, i.e. between the unripe stage and the ripe stage.

The resonance spectrum at different ripening stages of the apple can be used for an effective classification of ripeness levels using conventional fitting models, e.g. a Partial Least Square (PLS) model, for firmness prediction.

Figure 5B:
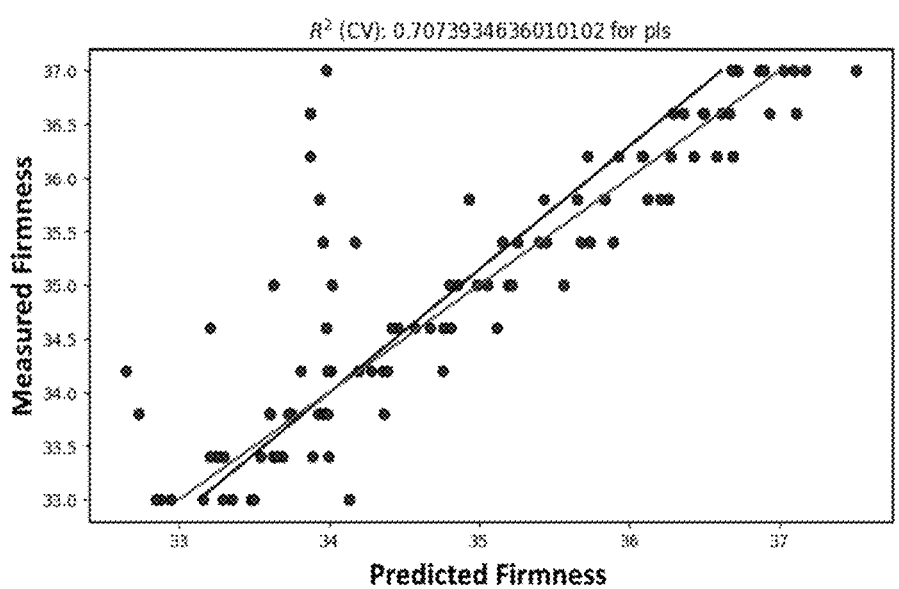
FIG. 5B shows an exemplary classification of firmness of the test sample using a PLS-based regression model.

In FIG. 5B, an exemplary classification of firmness of the test sample 201, e.g. the apple, using a PLS-based regression model is illustrated. The horizontal axis denotes the predicted firmness and the vertical axis denotes the measured firmness, where the R2(CV) denotes the correlation coefficient of the PLS regression model. The correlation between the measured firmness and the predicted firmness, especially based on the device response in the frequency domain, shows an acceptable performance in prediction of the firmness level of the test sample 201, e.g. the apple.

Figure 6:
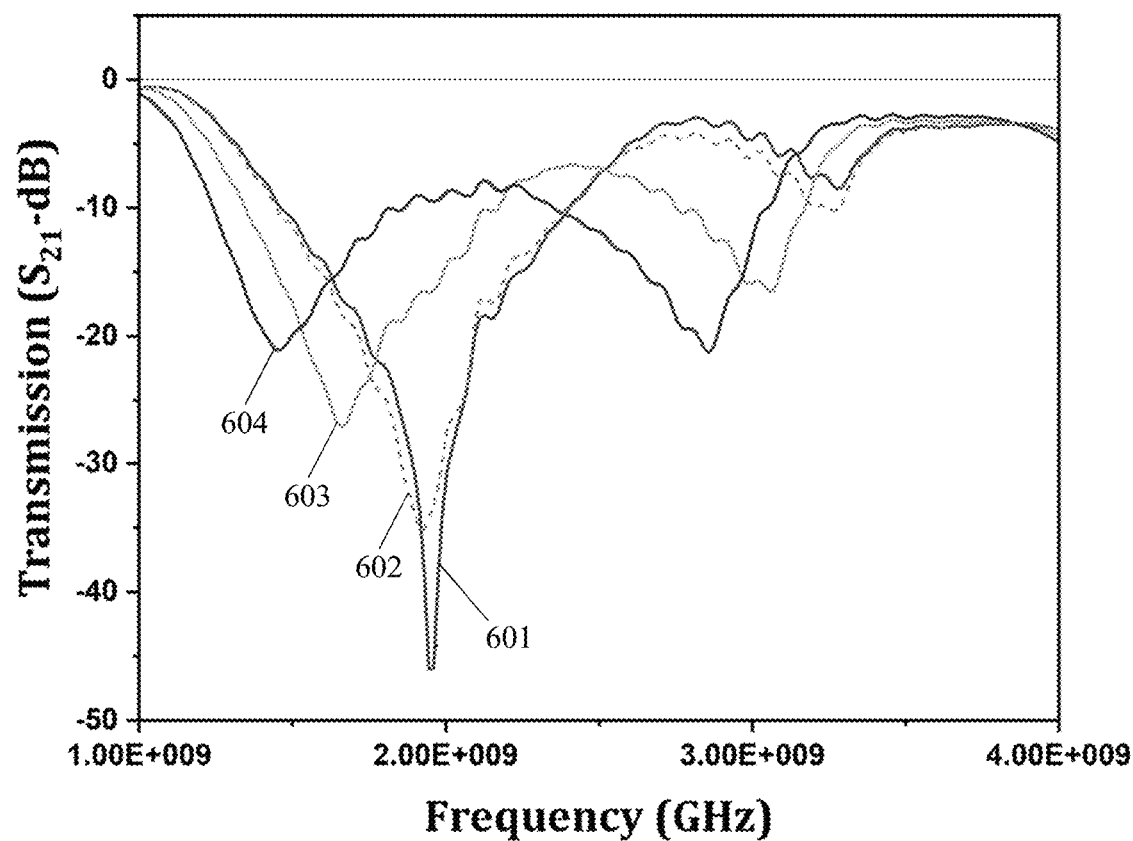
FIG. 6 shows exemplary transmission measurements on different test samples.

In FIG. 6, exemplary transmission measurements on different test samples are illustrated. The horizontal axis denotes the frequency in Gigahertz and the vertical axis denotes the measured transmission parameter (S21) in decibel.

Particularly, the curve 601 shows the transmission characteristics of the device 100, 300 without the test samples (i.e. bare response). The curve 602 shows the transmission characteristics of the device 100, 300 with a dry apricot as the test sample 201. The curve 603 shows the transmission characteristics of the device 100, 300 with a pear as the test sample 201. The curve 604 shows the transmission characteristics of the device 100, 300 with an apple as the test sample 201.

As such, a considerable shift in resonance between different test samples can be seen in the frequency domain, which can be effectively translated into the PLS regression model for firmness level prediction of the different test samples.

In FIG. 7, an exemplary embodiment of the method 700 according to the second aspect of the present disclosure is illustrated. In a first block 701, a resonator block is provided that comprises a groove at at least one side of the resonator block having at least a first inclined surface and a second inclined surface for contacting a test sample via the first inclined surface and/or the second inclined surface. In a second block 702, a rotational electric field coupled between the first inclined surface and the second inclined surface of the groove is generated, especially by the resonator block.

In a third block 703, the rotational electric field is partially or fully propagated through the test sample, especially by positioning the test sample at or near the groove, particularly between the first inclined surface and the second inclined surface. In a fourth block 704, the transmission through and/or the reflection from the test sample is measured.

Typically, the test sample such as, fruit or vegetables may undergo changes in one or more properties/characteristics (e.g., firmness, ripeness) over a period, which in-turn may change the dielectric property of the test sample. Further, any change in the dielectric property of the test sample may alter the effective material medium response, i.e., effective permittivity, of the resonator as shown in FIGS. 1-4B. This may result in a measurable shift in the transmission or reflection spectra, which in-turn indicates one or more characteristics (e.g., ripeness, firmness) of the test sample (e.g., fruit).

Generally, early in-field assessment of fruit ripeness enables the prediction and potentially the control of harvest date and yield. This is crucial to align production to demand while optimizing shelf life-time and product quality. Compared with traditional destructive methods, such as the labor-intensive Brix measurement or time-consuming laboratory analysis, non-destructive measurements have the following aspects:

(a) high-throughput assessment without generating waste, and
(b) they allow predictive modeling of fruit quality based on the assessment of actual fruit status while accounting for past and expected environmental conditions, thereby enabling real-time decision making.

RF/microwave-based dielectric sensing devices known in the art may have a limited sensing volume due to their limited coupling area and penetration depth. Furthermore, inherent to the single point contact approach, careful positioning of the probe may be required to avoid the presence of an air gap between the probe and fruit sample. Practically, one may need to rely on the flexibility of the fruit skin to ensure sufficient probe-sample contact, which may limit the sensing capability of the microwave resonators to probe fruit ripeness level.

The embodiments described herein generate a volumetric electric field distribution, particularly spatially linked rotational electric fields within the groove or slotted region of the resonator, and thereby allow direct electric field injection into the probing region of the fruit sample. The combination of direct field injection and a large coupling area enables deeper penetration into the fruit sample, thereby improving the interaction with the fruit sample, and thus sensitivity. Such an interaction or perturbation of the injected field with the fruit sample can be effectively used to derive resonance spectrum at different ripening stages of the fruit sample, which can be used for prediction and/or classification of maturity or ripeness characteristics, such as firmness, using conventional fitting models.

Furthermore, the depth of penetration into the fruit sample can be controlled by adjusting the features like the height of the bulk dielectric resonator or the stacked configuration, and/or the width of the groove or slotted area.

Moreover, the groove or slotted region enables the contact of at least two surface locations of the fruit sample with the device, which is sufficient and required for effective field injection into the fruit sample. Consequently, the problem of air gap from single point contact sensing approach can also be eliminated.

It is noted that, in the description as well as in the claims, the word "coupled" implies that the elements may be directly connected together or may be coupled through one or more intervening elements. Furthermore, the word "comprising" does not exclude other elements or steps and the indefinite article "a" or "an" does not exclude a plurality. A single element or other unit may fulfill the functions of several entities or items recited in the claims. Moreover, the description with regard to any of the aspects is also relevant with regard to the other aspects of the present disclosure.

Although the present disclosure has been illustrated and described with respect to one or more implementations, equivalent alterations and modifications will occur to others skilled in the art upon the reading and understanding of this specification and the annexed drawings. In addition, while a particular feature of the present disclosure may have been disclosed with respect to only one of several implementations, such feature may be combined with one or more other features of the other implementations as may be desired for any given or particular application.

What is claimed is:

1. A device for dielectric material characterization of a test sample comprising:
    a resonator block comprising a groove formed on at least one side of the resonator block, wherein the groove comprises at least a first inclined surface and a second inclined surface and is configured to contact the test sample via the first inclined surface and/or the second inclined surface,
    wherein the resonator block is configured to generate a rotational electric field coupled between the first inclined surface and the second inclined surface of the groove and further to propagate the rotational electric field partially or fully through the test sample in order to perform dielectric material characterization of the test sample,
    wherein the device further comprises a ground plane, a dielectric base arranged on the ground plane, and wherein the resonator block comprises a quasi-cubic dielectric resonator arranged near or on the dielectric base, and a buried metal line conductively coupled to the ground plane arranged near or at a center of the dielectric resonator perpendicular to the ground plane, whereby the dielectric resonator further comprises the groove positioned at one side of the dielectric resonator, and wherein the dielectric resonator is configured to generate an electric field, whereby the buried metal line is configured to circulate the electric field within the dielectric resonator, thereby generating the rotational electric field.

2. The device of claim 1,
wherein the device further comprises an input port configured to couple energy into the resonator block, and an output port configured to couple energy out of the resonator block.

3. The device of claim 2,
wherein the device further comprises signal lines corresponding to the input port and the output port arranged on the dielectric base in order to form a Microstrip configuration, whereby the Microstrip configuration is configured to encompass the resonator block, the input port and the output port.

4. The device of claim 1,
wherein the device further comprises signal lines corresponding to an input port and an output port arranged on the dielectric base in order to form a Microstrip configuration, whereby the Microstrip configuration is configured to encompass the resonator block, the input port and the output port.

5. The device of claim 1,
wherein the groove is a triangular groove, whereby the first inclined surface and the second inclined surface intersect at a point or at a curve.

6. The device of claim 1,
wherein the dielectric resonator comprises a dielectric material having a relative permittivity $\varepsilon_r$ of at least 10.

7. The device of claim 6, wherein the dielectric resonator comprises a dielectric material having a relative permittivity $\varepsilon_r$ of more than 50.

8. The device of claim 7, wherein the dielectric resonator comprises a dielectric material having a relative permittivity $\varepsilon_r$ of more than 70.

9. The device of claim 6, wherein the dielectric resonator comprises a dielectric material having a relative permittivity $\varepsilon_r$ of in the range of 80 to 100.

10. The device of claim 6, wherein the dielectric material is an oxide based and/or ceramic-based dielectric material.

11. The device of claim 6, wherein the dielectric material is a Titanium oxide-based dielectric material.

12. The device of claim 1,
wherein the resonator block comprises a plurality of resonator layers arranged in a stack formation on a dielectric base, each resonator layer comprises a dielectric substrate, and a split ring resonator arranged on the dielectric substrate.

13. The device of claim 12,
wherein the split ring resonator comprises a first split end and a second split end correspondingly arranged along the first inclined surface and the second inclined surface of the groove.

14. The device of claim 13,
wherein the resonator block further comprises a plurality of buried metal lines configured to couple the plurality of resonator layers in parallel such that a rotational electric field generated by each resonator layer couples to an adjacent resonator layer.

15. The device of claim 14,
wherein at least one buried metal line of the plurality of buried metal lines is arranged at or along the first inclined surface of the groove configured to conductively couple the first split ends of the plurality of resonator layers, and
wherein at least one buried metal line of the plurality of buried metal lines is arranged at or along the second inclined surface of the groove configured to conductively couple the second split ends of the plurality of resonator layers.

16. The device of claim 15,
wherein the groove is a uniformly tapered rectangular groove, whereby the first inclined surface and the second inclined surface are spatially positioned at a defined distance, and/or
wherein there is a gap between a first split end and a second split end of the split ring resonator.

17. The device of claim 1,
wherein the test sample is a product sample, a fruit sample, and the dielectric material characterization comprises one or more maturity characteristics of the product sample, especially content of ingredients such as water and/or sugar.

18. A method for dielectric material characterization of a test sample comprising:
providing a resonator block comprising a groove formed on at least one side of the resonator block having at least a first inclined surface and a second inclined surface for contacting the test sample via the first inclined surface and/or the second inclined surface,
generating a rotational electric field coupled between the first inclined surface and the second inclined surface of the groove,
propagating the rotational electric field partially or fully through the test sample;
measuring the transmission through and/or the reflection from the test sample, wherein the resonator block comprises a quasi-cubic dielectric resonator and a buried metal line, whereby the dielectric resonator comprises the groove positioned at one side of the dielectric resonator, and the method further comprising:
generating an electric field by the dielectric resonator; and
circulating the electric field within the dielectric resonator by the buried metal line in order to generate the rotational electric field.

\* \* \* \* \*